United States Patent
Kruglick

(10) Patent No.: US 9,534,800 B2
(45) Date of Patent: Jan. 3, 2017

(54) BIOFILTERS FOR LIVING SPACES

(75) Inventor: Ezekiel Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 208 days.

(21) Appl. No.: 13/126,448

(22) PCT Filed: Aug. 27, 2010

(86) PCT No.: PCT/US2010/047018
§ 371 (c)(1),
(2), (4) Date: Apr. 27, 2011

(87) PCT Pub. No.: WO2012/026947
PCT Pub. Date: Mar. 1, 2012

(65) Prior Publication Data
US 2012/0052480 A1 Mar. 1, 2012

(51) Int. Cl.
*C12M 1/00* (2006.01)
*C12Q 3/00* (2006.01)
*F24F 7/00* (2006.01)
*F24F 3/16* (2006.01)
*B01D 53/85* (2006.01)

(52) U.S. Cl.
CPC .............. *F24F 3/16* (2013.01); *B01D 53/85* (2013.01); *B01D 2259/4508* (2013.01); *F24F 2003/1653* (2013.01)

(58) Field of Classification Search
CPC ..... B01D 53/85; B01D 2259/4508; F24F 3/16
USPC .............. 435/299.1, 3, 283.1; 454/254
See application file for complete search history.

(56) References Cited

U.S. PATENT DOCUMENTS

| 2,121,173 | A | * | 6/1938 | MacPherson ............. 47/33 |
| 4,347,687 | A | * | 9/1982 | Sibbel ............. A01G 27/003 |
| | | | | 119/77 |
| 4,956,936 | A | * | 9/1990 | Sprung ............. A01G 9/247 |
| | | | | 47/17 |
| 4,961,763 | A | | 10/1990 | Thompson et al. |
| 5,078,972 | A | * | 1/1992 | Saceman ............. 422/124 |
| 5,201,860 | A | * | 4/1993 | Richardson ............. 47/39 |
| 5,433,923 | A | | 7/1995 | Wolverton et al. |
| 5,985,649 | A | * | 11/1999 | Stensel et al. ............. 435/266 |
| 2004/0023362 | A1 | * | 2/2004 | Stanley et al. ............. 435/262.5 |

(Continued)

FOREIGN PATENT DOCUMENTS

FR     2653296 A1 *  4/1991  ............. A01G 29/00
FR     2837723 A1    10/2003
(Continued)

OTHER PUBLICATIONS

Maxime Laguerre, "English language translation of French document FR2653296A1, translated on Jan. 7, 2016".*

(Continued)

*Primary Examiner* — Michael Hobbs
*Assistant Examiner* — Liban Hassan
(74) *Attorney, Agent, or Firm* — Pepper Hamilton LLP

(57) ABSTRACT

Techniques described herein are generally related to a biofilter for living spaces. The biofilter may include an organic biofilter medium to serve as a growth base for both plants and one or more microbial colonies. Example embodiments include systems, articles, methods and apparatus, as well as other embodiments that are described and claimed.

14 Claims, 9 Drawing Sheets

(56) References Cited

U.S. PATENT DOCUMENTS

| | | | |
|---|---|---|---|
| 2004/0043005 A1* | 3/2004 | Gunner et al. | 424/93.4 |
| 2005/0250201 A1* | 11/2005 | Daly | 435/299.1 |
| 2007/0178578 A1* | 8/2007 | Chalmer et al. | 435/266 |
| 2008/0014857 A1* | 1/2008 | Spadafora et al. | 454/229 |
| 2008/0134364 A1* | 6/2008 | Chaney et al. | 800/298 |

FOREIGN PATENT DOCUMENTS

| | | |
|---|---|---|
| WO | 03059037 A2 | 7/2003 |
| WO | WO 2007024255 A1 * | 3/2007 |
| WO | WO2011/115806 A2 | 9/2011 |

OTHER PUBLICATIONS

A. Darlington et al., "The Biofiltration of Indoor Air: Implications for Air Quality," Indoor Air 10, No. 1 (2000): 39-46.

A. V. Krishnayya and T. T. Wong, "Design and performance evaluation of vapor-phase biofilters," in Proceedings of the Battelle Memorial Institute International In-Situ and On-Site Bioreclamation Symposium, San Diego, Apr. 1999, 19-221999.

George A. Sorial et al., "Evaluation of trickle-bed air biofilter performance for styrene removal," Water Research 32, No. 5 (May 1998): 1593-1603.

Elmich Green Wall System, www.elmich.com.au, Elmich News, May 2007.

Knowles, et al. "Living Wall, A Feasibility Study for the SLC", University of Wateroo 2002.

International Search Report and Written Opinion for Application PCT/US10/47018, mailed Dec. 3, 2010.

Chitwood ,D. E and Devinny, J.S., "Treatment of Mixed Hydrogen Sulfide and Organic Vapors in a Rock Medium Biofilter," Water Environment Research, Jul.-Aug. 2001,vol. 73, No. 4, pp. 426-435.

Darlington, A., et al., "The use of biofilters to improve indoor air quality: the removal of toluene, TCE, and formaldehyde," Life Support Biosphere Science, 1998, vol. 5, No. 1, pp. 63-69.

Wani, A.H., et al., "Biofiltration: A promising and cost-effective control technology for Odors, VOCs and air toxics," Journal of Environmental Science and Health—Part A: Environmental Science and Engineering and Toxicology, 1997, vol. 32, No. 7, p. 2027-2055.

Zhang, L., et al., "Oxidation of dimethyl sulfide by Pseudomonas acidovorans DMR-11 isolated from peat biofilter," Biotechnology Letters, 1992, vol. 13, No. 3, pp. 223-228.

European Search Report dated May 30, 2014 for corresponding application EP 10856525.0.

* cited by examiner

BIOFILTERS FOR LIVING SPACES

CROSS-REFERENCE TO RELATED APPLICATION

The present application is a U.S. National stage filing under 35 U.S.C. §371 of International Application No. PCT/US10/47018, filed on Aug. 27, 2010.

BACKGROUND

Air filtration for confined human spaces faces a challenge in the removal of volatile organic compounds (VOCs). VOCs, e.g., formaldehyde, are emitted from plastics, adhesives, and construction materials. Presence of VOCs and other airborne contaminants compromise indoor air quality and increase the risk of adverse health effects from prolonged exposure.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
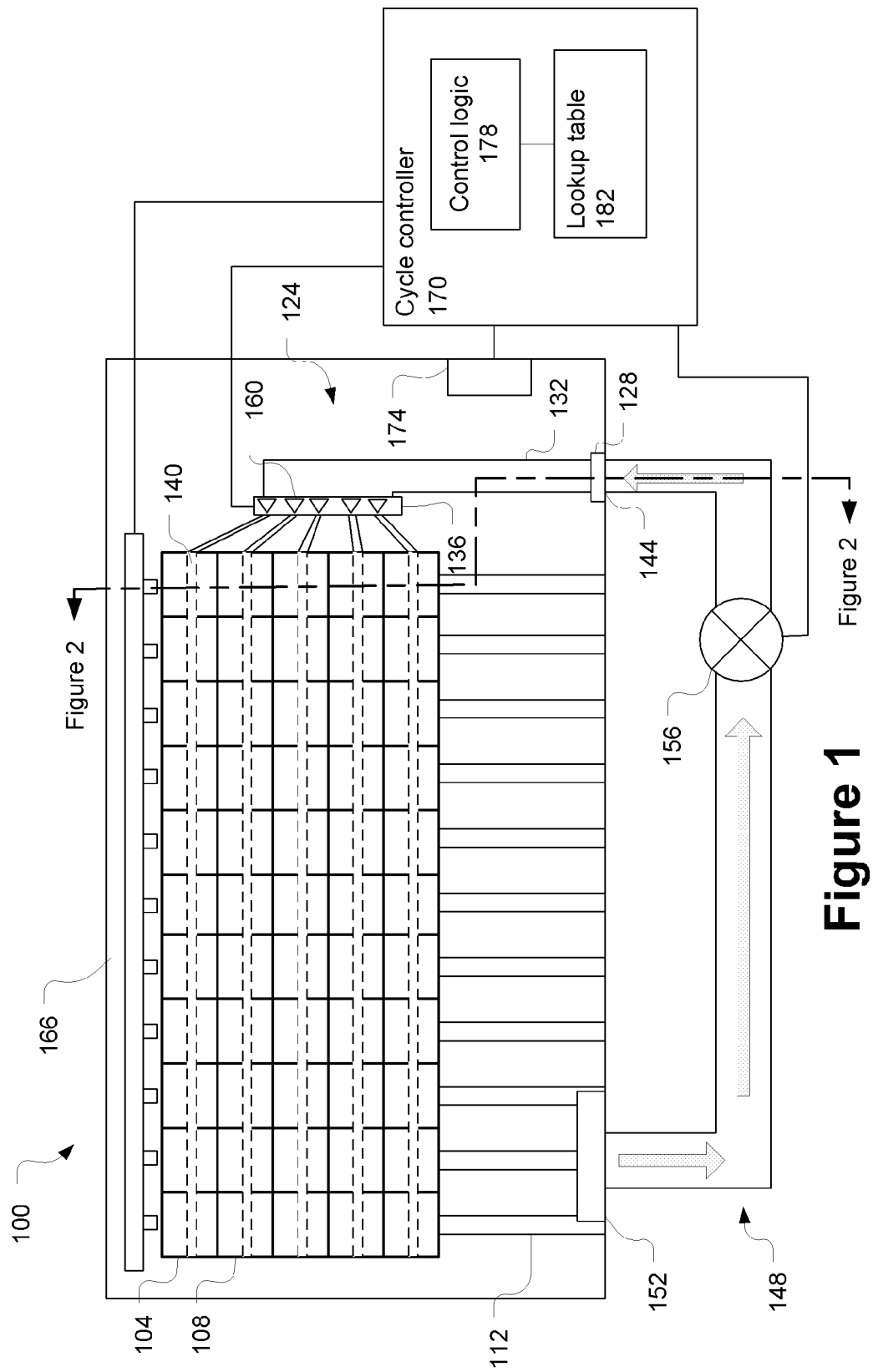
FIG. 1 illustrates a front view of a biofilter system.

The following description sets forth various examples along with specific details to provide a thorough understanding of claimed subject matter. It will be understood by those skilled in the art that claimed subject matter may be practiced without some or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

This disclosure is drawn to, inter alia, methods, apparatuses, articles, and systems related to a biofilter for living spaces. Various embodiments describing implementations and uses of an organic biofilter medium are disclosed. The organic biofilter medium may serve as a growth base for both plants and one or more microbial colonies. Microbial colonies may biologically degrade various airborne contaminants. In some embodiments, an air-distribution network, coupled with a building's air-circulation system, may provide a distributed airflow through the organic biofilter medium. The organic biofilter medium may be part of and/or within a panel structure or in a stand-alone planter. A panel structure may be a structure that provides at least a partial boundary to a living space, e.g., a wall, a ceiling, a floor, a partition, etc. The panel structure may also be a structure that may be located within a living space but not necessarily provide at least a partial boundary of the living space. For example, the panel structure may be a free-standing structure, a structure to be hung on an existing wall, etc.

Figure 2:
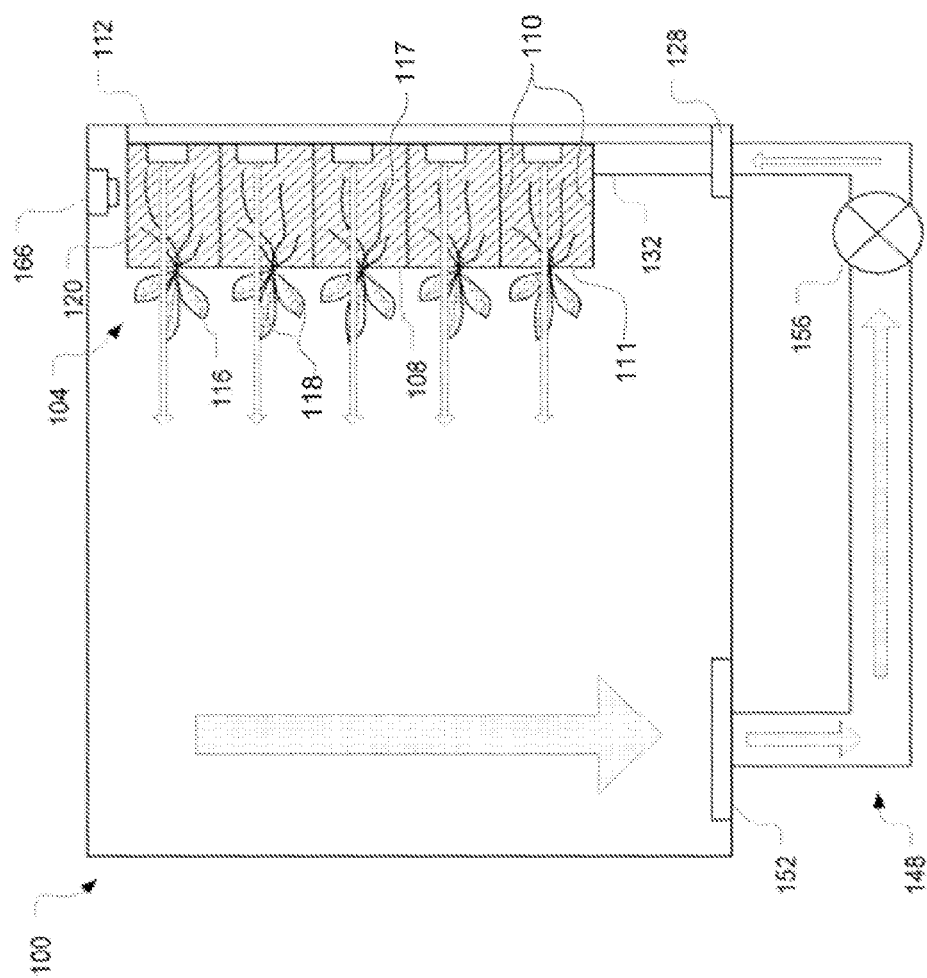
FIG. 2 illustrates a cross-sectional side view of the biofilter system of FIG. 1.

FIGS. 1 and 2 respectfully illustrate a front view and a cross-sectional side view of a biofilter system 100 arranged in accordance with at least some embodiments described herein. The biofilter system 100 may include a panel structure 104 having a plurality of modules 108. The modules 108 may be fastened to supports 112. Each module 108 ma be in physical contact with one or more other modules 108. Physical contact between adjacent modules 108 may or may not include a physical coupling. The modules 108 may include side faces 110 and a grating 111, as discussed in detail below with reference to the embodiment depicted in FIG. 3, and may host plants 116 and an organic biofilter medium 120. Plant roots 117 may be disposed in the organic biofilter medium on a first side of the grating 111 and leaves 118 on a second side of the grating. The plants 116 and the organic biofilter medium 120 are shown in FIG. 2, but not shown in FIG. 1 for clarity.

In various embodiments the modules 108 may be constructed of materials that provide desired structural integrity. These materials include but are not limited to polypropylene, acrylonitrile butadiene styrene, polyamides, polyvinyl chloride (PVC), polycarbonate, metal alloy, aluminum, steel, titanium, etc.

The biofilter system 100 may include an air-distribution network 124. The air-distribution network 124 may include a vent interface 128, a connector 132, a flow-control device 136, and one or more ventilators 140.

In various embodiments, ventilators 140 may be composed of, e.g., any type of metal and/or polymer such as but not limited to PVC, nylon composites, natural or synthetic rubber, polypropylene, acrylonitrile butadiene styrene, etc.

The vent interface 128 may be coupled with a vent 144 of an air-circulation system 148 of a building. The air-circulation system 148 may also include a return vent 152 and a flow-generating device 156, e.g., pump, fan, impeller, etc., to provide a forced airflow through the vent 144 and into the air-distribution network 124. Airflow is shown by unidirectional block arrows in the figures. The air-circulation system 148 may include a variety of elements not expressly shown that work to condition an indoor environment for health and comfort of a building's inhabitants. These elements could include, but are not limited to, heating elements, cooling elements, filtration elements, air-exchange elements, condensers, etc.

The flow-control device 136 of the air-distribution network 124 may receive a forced airflow from the vent interface 128 through the connector 132. The flow-control device 136 may include a plurality of valves 160 that may be independently controlled to vary airflow provided to each of the ventilators 140. The valves 160 may be electrically and/or mechanically controlled. In some embodiments, the flow-control device 136 may include one or more flow generating devices, which may be independently controlled to vary airflow. In some embodiments, the flow-control device 136 may be omitted with the connector 132 coupled directly to the ventilators 140.

In this manner, the air-distribution network 124 may provide a distributed airflow through the organic biofilter medium 120 within the panel structure 104. As the air is circulated through the organic biofilter medium 120, one or more microbial colonies hosted within the organic biofilter medium 120 may filter the air by biologically degrading various airborne contaminants. The degraded contaminants may ultimately be converted into plant matter by being consumed by the plants 116 from the organic biofilter medium 120.

FIGS. 1 and 2 show the air from the air-circulation system 148 being pushed out through the panel structure 104. Other embodiments may provide that the air is pulled through the panel structure 104, with similar air-filtering effects. However, if the air is pulled through the panel structure 104, it may be that the humidity levels are raised in the air that is returned to the air-circulation system 148. In some instances, this may cause a decrease in performance of the air-circulation system 148. For example, dehumidification of the returned air may increase the time and/or energy consumed in a cooling process performed by the air-circulation system 148.

The composition of the organic biofilter medium 120 may be selected to provide a suitable porosity to facilitate airflow through the organic biofilter medium 120, to provide a suitable growth base for desired plants 116, and to provide a suitable growth base for desired microbial colonies that interact with targeted airborne contaminants. In some embodiments, the organic biofilter medium 120 may include, with percentages by volume, 16%-20% peat moss, e.g., 18% peat moss; 5%-10% vermiculite, e.g., 7.5% vermiculite; 1%-3% limestone, e.g., 2% limestone; 18%-22% pine bark, e.g., 20% pine bark; 25%-35% organic compost, e.g., 30% organic compost; 13% to 17% spent activated carbon, e.g., 15% spent activated carbon; 1.5-3.5 liters per cubic meter of bacteria triggering material (BTM), e.g., 2 liters per cubic meter of BTM, available from reagent supply companies; 0.3-0.7 liters per cubic meter of humic acid (for pH buffering), e.g., 0.5 liters per cubic meter of humic acid; and 80-100 grams per cubic meter of potassium nitrate (for fertilizing), e.g., 90 grams per cubic meter of potassium nitrate. The spent activated carbon may be from used VOC filters; however, the spent activated carbon may serve as a planting medium, rather than a VOC filter, in the organic biofilter medium 120.

The desired microbial colonies may be dependent on the relative concentrations of airborne contaminants typically found in the environment in which the biofilter system 100 is deployed. In many embodiments, the organic biofilter medium 120 may support microbial colonies that remove formaldehyde, which, as stated above, is an airborne contaminant that is often found in indoor environments. In other embodiments, the OBM 120 may support microbial colonies that remove other molecules such as but not limited to phenols, styrene, toluene, Methyl tert-butyl ether (MTBE), dichlorobenzenes, and/or other unhealthy/unpleasant organic and semi-organic molecules.

In various embodiments, the microbial colonies may include organisms among genus lines such as, but not limited to, *cylindrosporium, phomopsis, ramichloridium, rosulomyces, torulopsis, zygosporium, acinetobacter, azoarcus, mycobacterium, nevskia, pseudomonas, pseudonocardia, rhodococcus, xanthomonas, stenotrophomonas,* and *gordona*. While some of these organisms may react with nonspecific airborne contaminants, others may be particularly useful for selected contaminants. For example, *pseudonocardia* and *rhodococcus* may be particularly useful in filtering toluene; *xanthomonas* and *stenotrophomonas* may be particularly useful in filtering ammonia; and gordona may be particularly useful in filtering strong biological odors.

In some embodiments, one or more microbial colonies may be contiguous throughout the entire panel structure 104. In other embodiments, sections of the panel structure 104, defined by a grouping of one or more adjacent modules 108, may include one or more microbial colonies isolated from other sections.

The plants 116 may include species from various genera depending on both aesthetic and functional objectives, some of which will be discussed below. Non-limiting examples of plant genus that may be used include *Actinidia, Akebia quinata/trifoliate, Aristolochia, Campsis, Celastrus, Clematis, Cotoneaster, Euonymus fortunei, Ficus* (e.g., *Ficus pumila*), *Hedera, Humulus lupulus, Hydrangea petiolaris, Lonicera, Parthenocissus tricuspidata/quinquefolia/inserta, Vitis berlandieri/riparia, Polygonum auberti, Pyracantha, Thlaspi* (e.g., *Thlaspi caerulescens, Thlaspi rotundifolium*) and *Wisteria*.

In some embodiments, plants 116 may be phytoremediates that neutralize harmful materials. For example, Thlaspi caerulescens is a metallophyte that helps to capture heavy metals that may otherwise harm organisms within the organic biofilter medium 120, thereby creating a synergy between organic biofilter medium 120 and plants 116. In some embodiments, organic biofilter medium 120 may support other growth having desirable characteristics. For example, fungi that are mycoremediates may be used to neutralize harmful materials, similar to plants discussed above. One example of such a mycoremediate is a fungus from the genus *Pleurotus*, which may consume oils and VOCs to improve the indoor air quality and/or functioning of the organic biofilter medium 120.

The biofilter system 100 may also include an irrigator 166. The irrigator 166 may provide an irrigation solution to the plants 116 and/or the organic biofilter medium 120. The irrigation solution may include, but is not limited to, water, nutrients, fertilizers, and supplements. In some embodiments, the irrigator 166 may additionally/alternatively include a vaporizer to provide at least some of the irrigation solution to the plants 116 and/or the organic biofilter medium 120 in a vaporized form. While the irrigator 166 is shown as a top-drip system, in other embodiments, the irrigator 166 may provide distributed delivery of the irrigation solution in additional/alternative ways. In some embodiments, the irrigator 166 may be integrated into the modules 108 themselves. The irrigator 166 may be controlled in a manner to keep the organic biofilter medium 120 continually moist. This is contrary to a standard green wall in which soil is allowed to dry to prevent microbial growth, e.g., mold.

In addition to filtering airborne contaminants, the biofilter system 100 may also work to condition the temperature and/or humidity of the indoor environment. For example, the plants 116 may emit moisture in a process called transpiration. Evaporation of the emitted moisture may work to cool a room. Through transpiration, the plants 116 may modulate the amount of moisture they emit based on the current humidity and temperature. For example, the plants 116 may increase emissions of moisture when the temperature rises. In this manner, the biofilter system 100 may function as a natural feedback loop to keep the indoor environment in a comfortable range. Different plants may be selected for different temperature ranges.

In some embodiments, a cycle controller 170 may be electrically coupled with various elements of the biofilter system 100 and/or the air-circulation system 148 to control operation. For example, the cycle controller 170 may be electrically coupled with the flow-control device 136, the flow-generating device 156, the irrigator 166, and/or a sensor 174. In some embodiments, the cycle controller 170 may control these various elements based on feedback from the sensor 174. The cycle controller 170 may include control logic 178 and a lookup table 182 having ranges associated with monitored parameters that may be used in the control of the various elements. The sensor 174 may include one or more sensing elements to monitor specific parameters within the biofilter system 100. The sensing elements may be aggregated in one device or distributed in several devices that communicate with one another over wired and/or wireless communication links.

Some of the parameters that may be monitored are indoor air quality parameters that include airborne contaminants (e.g., VOCs, particulates, carbon dioxide, carbon monoxide, formaldehyde, styrene, toluene, dichlorobenzene, petroleum hydrocarbons, ammonia, etc.) and/or comfort factors (e.g., temperature, humidity, etc.). The sensor 174 may additionally/alternatively include sensing elements that are coupled directly with one or more of the modules 108 to monitor parameters associated with a condition of the organic biofilter medium 120, e.g., moisture levels, nutrient levels, etc.

In various embodiments, the cycle controller 170 may include hardware, firmware, and/or software components that are configured to operate to provide the control capabilities described in conjunction with disclosed embodiments. As will be understood, software components of the cycle controller 170 may include instructions stored in a computer readable medium, that, when executed by a processor result in a machine performing the described operations.

Operation and control of the biofilter system 100 may be described in further detail below in accordance with various embodiments.

Figure 3:
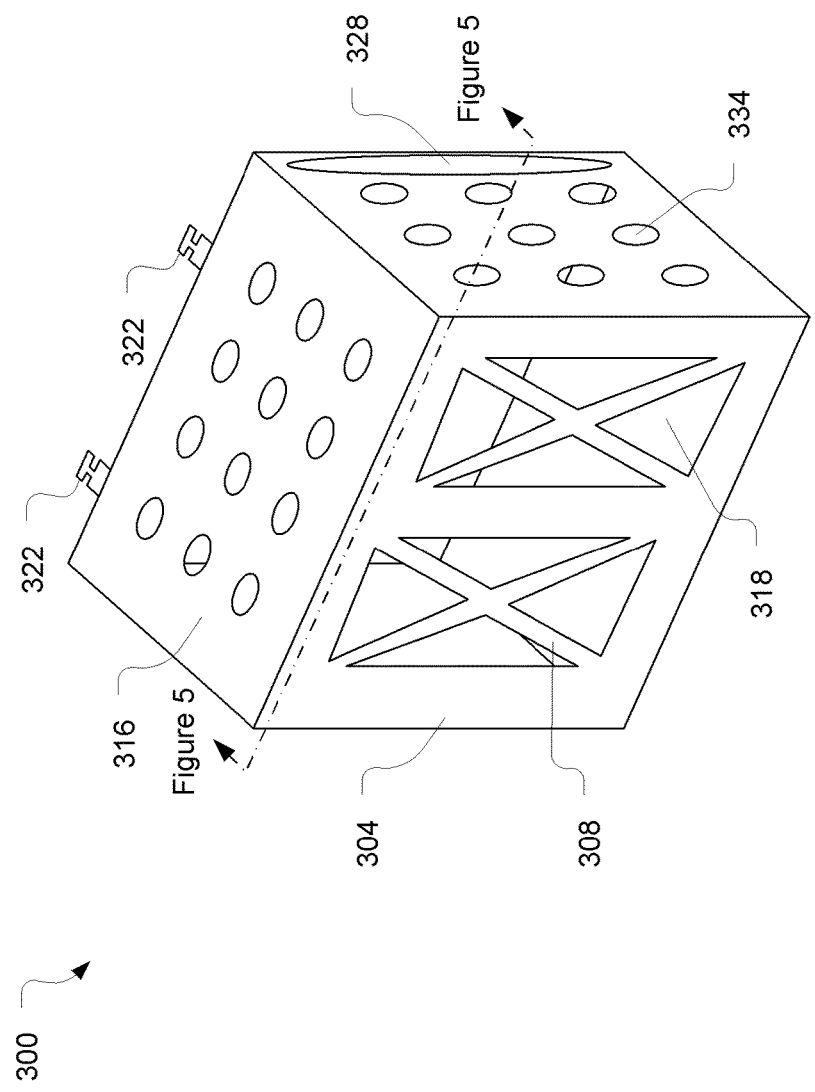
FIG. 3 illustrates a perspective view of a module.
Figure 4:
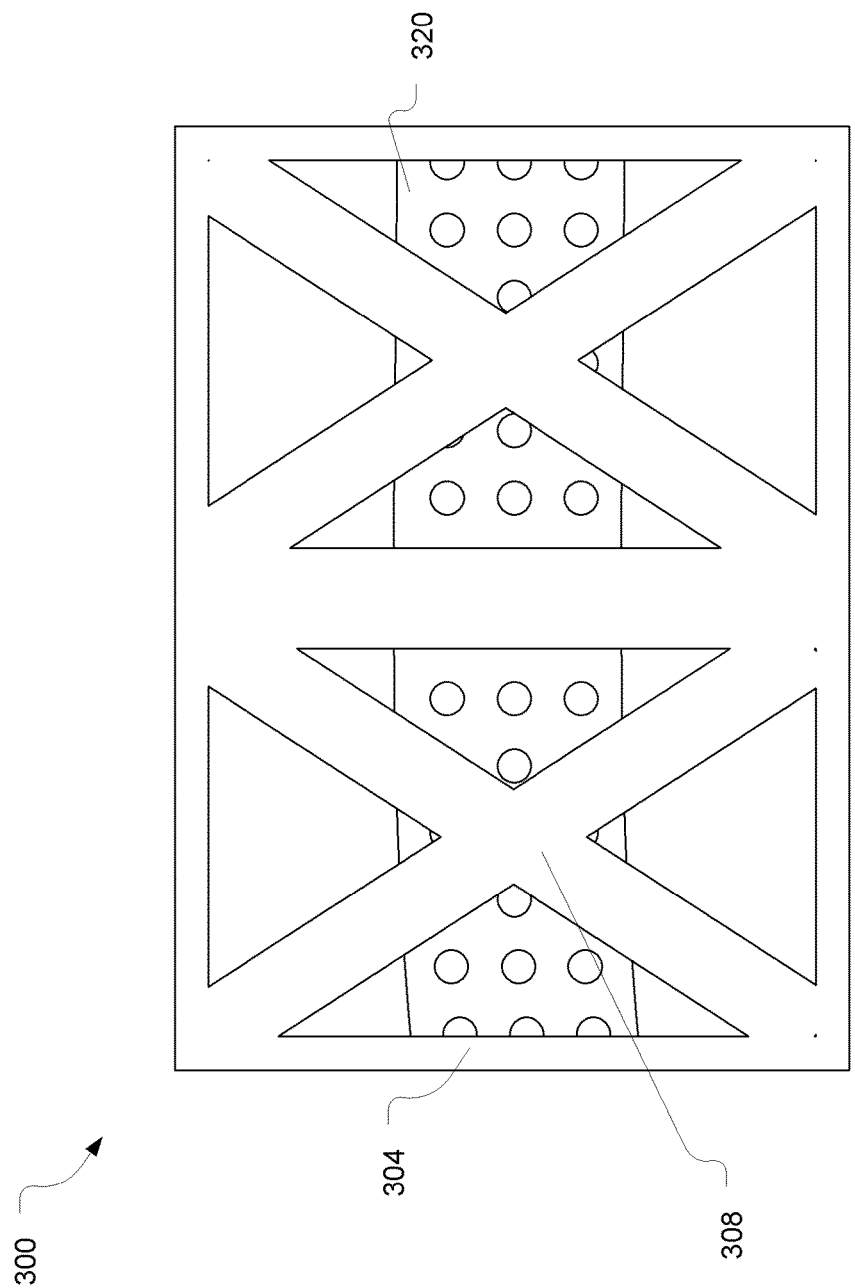
FIG. 4 illustrates a front view of the module of FIG. 3.
Figure 5:
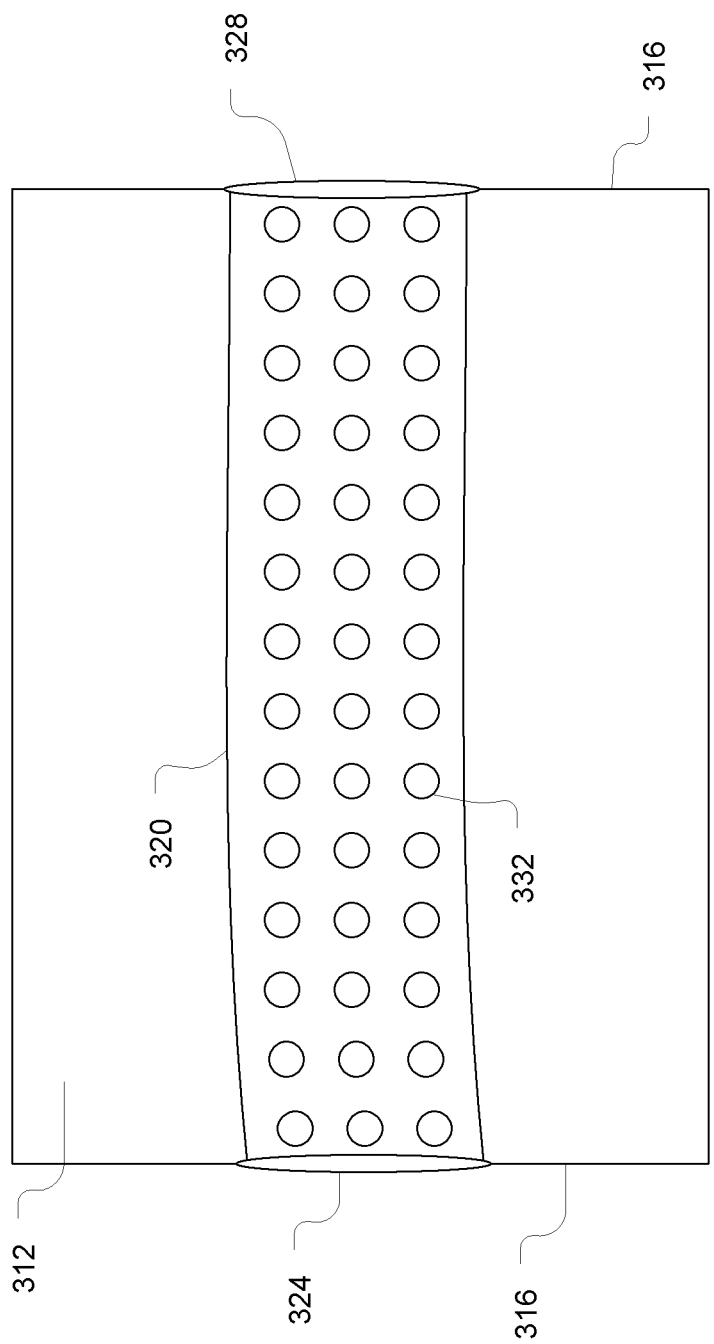
FIG. 5 illustrates a cross-sectional front view of the module of FIG. 3.

FIGS. 3, 4, and 5 respectively illustrate a perspective view, a front view, and a cross-sectional front view of a module 300 that may be used in the biofilter system 100 in accordance with at least some embodiments described herein. The module 300 may be similar to, and substantially interchangeable with, one or more of the modules 108. In some embodiments a panel structure, e.g., panel structure 104, may include a plurality of identical modules, e.g., module 300. The module 300 may include a front face 304 with a grating 308, a back face 312, and one or more side faces 316. Grating 308 may be designed to retain an organic biofilter medium within a cavity 318. The grating 308 may further allow for plants to have their roots in the organic biofilter medium on a first side of the grating 308 and their leaves on a second side of the grating 308; the first side being opposite from the second side. In some embodiments, one or more of the faces may be detachable in order to facilitate filling of the cavity 318 with a volume of organic biofilter medium. The module 300 may also include one or more brackets 322 to engage a wall support, e.g., support 112.

As can be seen in FIG. 5, the module 300 may include a ventilator 320, a portion of which is also visible in FIG. 4. The ventilator 320 may be located adjacent to, coupled with, and/or integrated within the back face 312. The ventilator 320 may include a first air interface 324 and a second air interface 328 (also visible in FIG. 3). The air interfaces 324 and 328 may be designed to be physically coupled with other air interfaces with a substantially airtight seal to provide a serial, flow coupling of adjacent ventilators. The other air interfaces may be in adjacent modules, a connector (e.g., that connects with the flow-control device 136 or connector 132), or a stopper (e.g., if the module 300 is the last in a series of modules). In some embodiments, apertures in the side faces 316 may be placed in the area of the air interfaces 324 and 328. In these embodiments the ventilator 320 may include a hose that is routed through these apertures.

The ventilator 320 may include a number of perforations 332 designed to provide a distributed airflow interface to an organic biofilter medium, e.g., organic biofilter medium 120, that is located within the cavity 318 of the module 300. While the perforations 332 are shown as circular perforations arranged in uniform rows, other embodiments may include perforations of any shape, e.g., rectangle, oval, square, etc., arranged in any pattern that is suitable for the particular objectives of a given embodiment. In an embodiment in which the air is pushed through a panel structure, the air from the ventilator 320 may flow through the organic biofilter medium and out through the grating 308 of the front face 304. In some embodiments, the ventilator 320 may additionally/alternatively be permeable to provide the distributed airflow interface. In such embodiments, ventilator 320 may include portions (either discrete sections of the entirety of ventilator 320) that include pores and/or interstices that are configured to allow for passage of airflow to cavity 318.

The cavity 318, located between the front face 304 and the back face 312, may be of a sufficient size to support a desired volume of organic biofilter medium. The desired volume may be determined based on airflow rates through the organic biofilter medium and biological reaction times of the microbial colony of the organic biofilter medium. For example, it may be desirable that the amount of time that the airflow takes to travel from the ventilator 320 to the front face 304 provides a resident microbial colony sufficient time to break down a significant portion of the airborne contaminants that exist in the airflow. The desired volume may additionally/alternatively be based on the dimensions of the rooting structures of the plants 116 and/or other factors.

The side faces 316 may include a number of apertures 334 to provide a permeable interface with adjacent modules. The permeable interface may facilitate the flow of air, irrigation solution, and/or microbial colonies across modules. In an embodiment in which a microbial colony is intended to be isolated to a particular section of the panel structure 104, the border modules may include side faces without apertures to provide a non-permeable interface.

Figure 6:
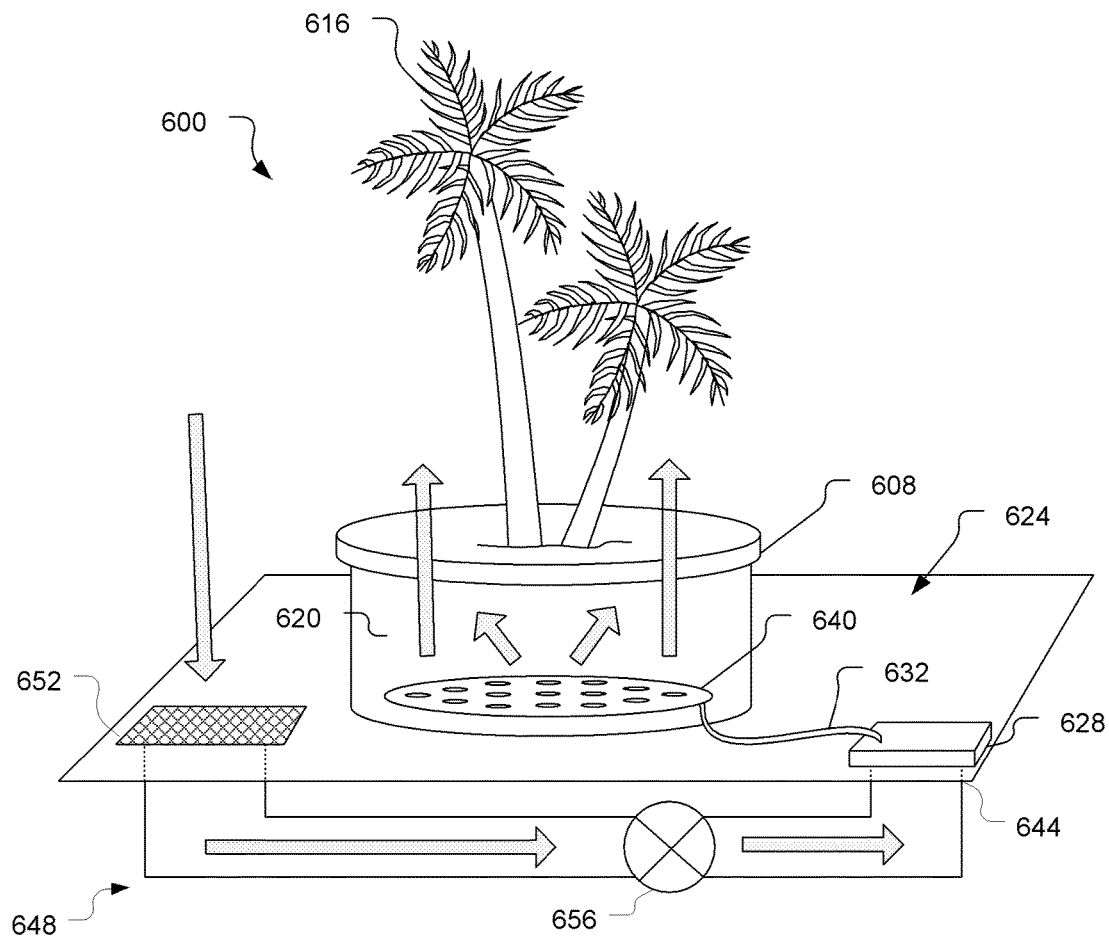
FIG. 6 illustrates another biofilter system.

FIG. 6 illustrates a biofilter system 600 arranged in accordance with at least some embodiments described herein. The biofilter system 600 may be similar to biofilter system 100 with the exception of the differences noted herein.

The biofilter system 600 may include an air-distribution network 624 that includes a vent interface 628, a connector 632, and a ventilator 640. The vent interface 628 may be coupled with a vent 644 of an air-circulation system 648. The air-circulation system 648 may also include a return vent 652 and a flow-generating device 656 to provide a forced airflow through the vent 644 and into the air-distribution network 624.

The biofilter system 600 may include a planter 608 that provides a growth base for both plants 616 and an organic biofilter medium 620. The organic biofilter medium 620 may be similar to the organic biofilter medium 120 described above. The ventilator 640 may be located at the bottom of the planter 608.

The ventilator 640 may provide a distributed airflow through the organic biofilter medium 620. As the air is circulated through the organic biofilter medium 620, one or more microbial colonies hosted within the organic biofilter medium 620 may filter the air by biologically degrading various airborne contaminants, similar to the process described above with respect to biofilter system 100.

While not explicitly shown, the biofilter system 600 may include various other elements shown and described with respect to the biofilter system 100. For example, the biofilter system 600 may include an irrigator, a flow-control device, a cycle controller, a sensor, etc., that operate in manners similar to those described above. Furthermore, the ventilator 640 may also include one or more air interfaces so that it may be serially flow coupled with one or more other ventilators as is described above with respect to ventilator 320.

Figure 7:
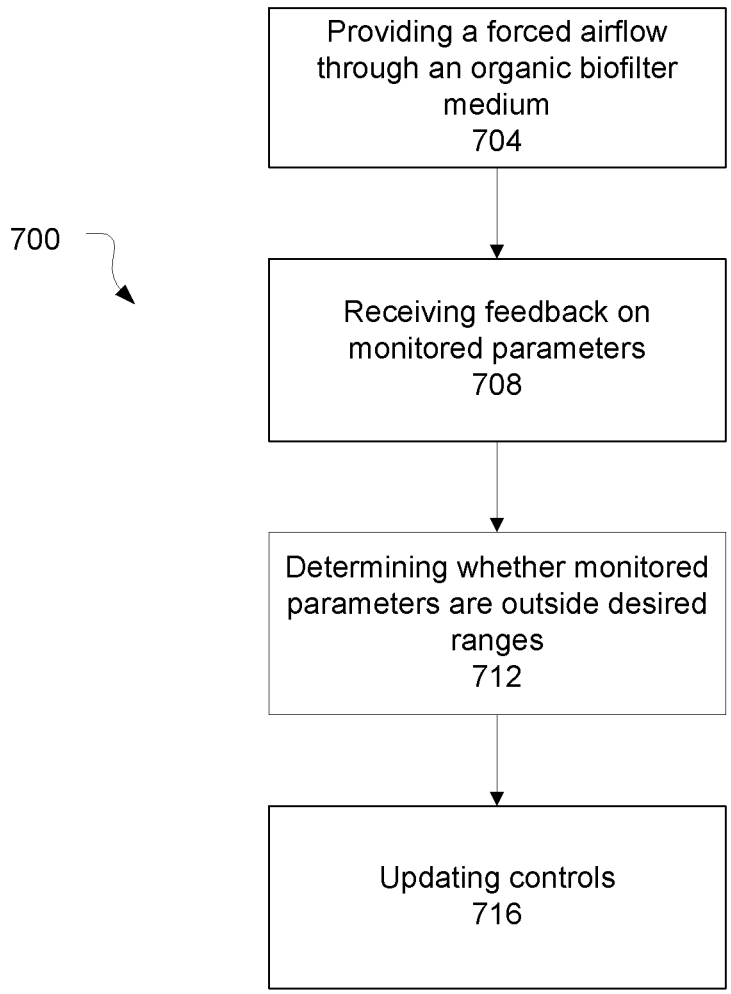
FIG. 7 is a flow diagram of control operations of a cycle controller.

FIG. 7 is a flow diagram of operations of a cycle controller of a biofilter system, e.g., cycle controller 170, in accordance with at least some embodiments of the present disclosure. Flow diagram 700 illustrates one or more operations, functions, or actions as illustrated by one or more of blocks 704, 708, 712, and/or 716. Processing may start at block 704.

At block 704 ("Providing a forced airflow through an organic biofilter medium"), the operations may include controlling an air-circulation system, e.g., air-circulation system 148, and/or an air-distribution network, e.g., air-distribution network 124, to provide a forced airflow through an organic biofilter medium, e.g., organic biofilter medium 120. Block 704 may be followed by block 708.

At block 708 ("Receiving feedback on monitored parameters"), the operations may include receiving, e.g., from sensor 174, feedback on monitored parameters. The monitored parameters may include an IAQ parameter and/or an organic biofilter medium parameter. As mentioned above, the IAQ parameters may include airborne contaminants and/or comfort factors and the organic biofilter medium parameter may be a parameter associated with a condition of the organic biofilter medium. Block 708 may be followed by block 712.

At block 712 ("Determining whether monitored parameters are outside desired ranges"), the operations may include a determination of whether the monitored parameters are outside desired ranges. Each monitored parameter may be associated with its own desired range. These ranges may be provided based on IAQ recommendations for a healthy indoor environment and/or on personal preferences. These ranges may be adjustable in some embodiments.

At block 716 ("Updating controls"), the operations may include updating controls to an air-circulation system, e.g., the air-circulation system 148, an air-distribution network, e.g., air-distribution network 124, and/or an irrigator, e.g., irrigator 166. The updated controls may include control signals to effect operating changes in one or more of the controlled elements. The particular control signals may be based on which monitored parameter is outside its associated operating range. For example, if it is determined, at block 712, that concentrations of VOCs are outside, e.g., above, a desired range, control signals may be sent to the air-circulation system and/or the air-distribution network to reduce an airflow rate through the biofilter system. This may provide the air more exposure time to a microbe colony resident within the organic biofilter medium.

As described above, some embodiments may include a particular section of a biofilter system dedicated to reducing particular airborne contaminants. If, in such embodiments, it is determined, at block 712, that a concentration of that particular airborne contaminant was outside of its desired range, controls may be sent to an airflow control device to increase the relative airflow provided to the associated section. For example, in one embodiment a section of a biofilter system may include an organic biofilter medium that supports pseudonocardia and/or rhodococcus. If it is determined that toluene is present in concentrations above a desired range, an airflow control device may be controlled to send more airflow to that section of the biofilter system.

In some embodiments, emissions of spores from the plants of a biofilter system (or particulates in general) may be a monitored parameter. If, in such embodiments, it is determined, at block 712, that the spore emissions are outside of a desired range, control signals may be sent to the air-circulation system and/or the air-distribution network to reduce an airflow through the biofilter system, which may also reduce spore emissions.

In yet another example, if it is determined, at block 712, that an organic biofilter medium parameter, e.g., moisture levels, is outside of a desired range, control signals may be sent to an irrigator to increase an amount of irrigation solution provided to the modules.

Although flow diagram 700 is illustrated as a series of sequential operations, the operations described in one or more of the blocks 704, 708, 712, and/or 716 may take place contemporaneously with one another or in any other order. Moreover, methods within the scope of this disclosure may include more or fewer operations than that illustrated in FIG. 7.

Figure 8:
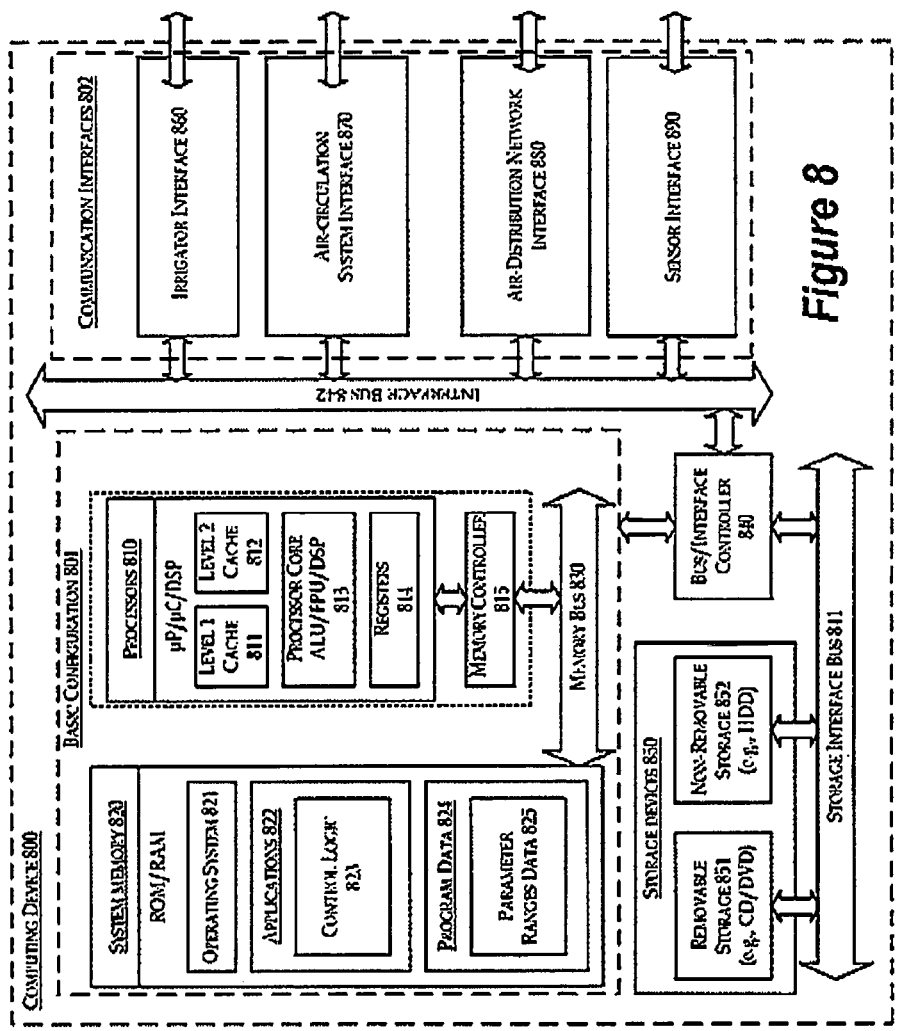
FIG. 8 is a block diagram of an example computing device that may be adapted to operate as a cyclic controller in a biofilter system.

FIG. 8 is a block diagram of an example computing device that may be adapted to operate as a cyclic controller in a biofilter system arranged in accordance with at least some embodiments of the present disclosure. In a very basic configuration 801, computing device 800 may include one or more processors 810 and system memory 820. A memory bus 830 may be used for communicating between the processors 810 and the system memory 820.

Depending on the desired configuration, processors 810 may be of any type including but not limited to a microprocessor (µP), microcontroller (µC), digital signal processor (DSP), or any combination thereof. Processors 810 may include one or more levels of caching, such as a level one cache 811 and a level two cache 812, a processor core 813, and registers 814. An example processor core 813 may include an arithmetic logic unit (ALU), a floating point unit (FPU), a digital signal processing core (DSP Core), or any combination thereof. An example memory controller 815 may also be used with the processors 810, or in some implementations the memory controller 815 may be an internal part of the processors 810.

Depending on the desired configuration, the system memory 820 may be of any type including but not limited to volatile memory (such as RAM), non-volatile memory (such as ROM, flash memory, etc.) or any combination thereof. System memory 820 may include an operating system 821, one or more applications 822, and program data 824. Applications 822 may include control logic 823 that provides programming instructions configured to implement the above-described cycle control operations. Program data 824 may include the applicable variable and related values associated with practicing the cycle control operations including, but not limited to, parameter ranges data 825 that provides information on the desired ranges for monitored parameters. The parameter ranges data 825 may additionally/alternatively be stored in one or more data storage devices 850.

Computing device 800 may have additional features or functionality, and additional interfaces to facilitate communications between the basic configuration 801 and any required devices and interfaces. For example, a bus/interface controller 840 may be used to facilitate communications between the basic configuration 801 and the data storage devices 850 via a storage interface bus 841. The data storage devices 850 may be removable storage devices 851, non-removable storage devices 852, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and non-volatile, removable and non-removable media implemented in any method or technology for storage of information, such as computer readable instructions, data structures, program modules, or other data.

System memory 820, removable storage 851 and non-removable storage 852 are all examples of computer storage media. Computer storage media includes, but is not limited to, RAM, ROM, EEPROM, flash memory or other memory technology, CD-ROM, DVD or other optical storage, magnetic cassettes, magnetic tape, magnetic disk storage or other magnetic storage devices, or any other medium which may be used to store the desired information and which may be accessed by computing device 800. Any such computer storage media may be part of computing device 800.

Computing device 800 may also include an interface bus 842 for facilitating communication between various communication interfaces 802 to the basic configuration 801 via the bus/interface controller 840. The communication interfaces 802 may include an irrigator interface 860 to communicate with an irrigator, an air-circulation system interface 870 to communicate with an air-circulation system, an air-distribution network interface 880 to communicate with an air-distribution network, and/or a sensor interface 890 to communicate with a sensor. The basic configuration 801 may receive feedback from and/or issue control signals through the appropriate interfaces of the communication interfaces 802.

Figure 9:
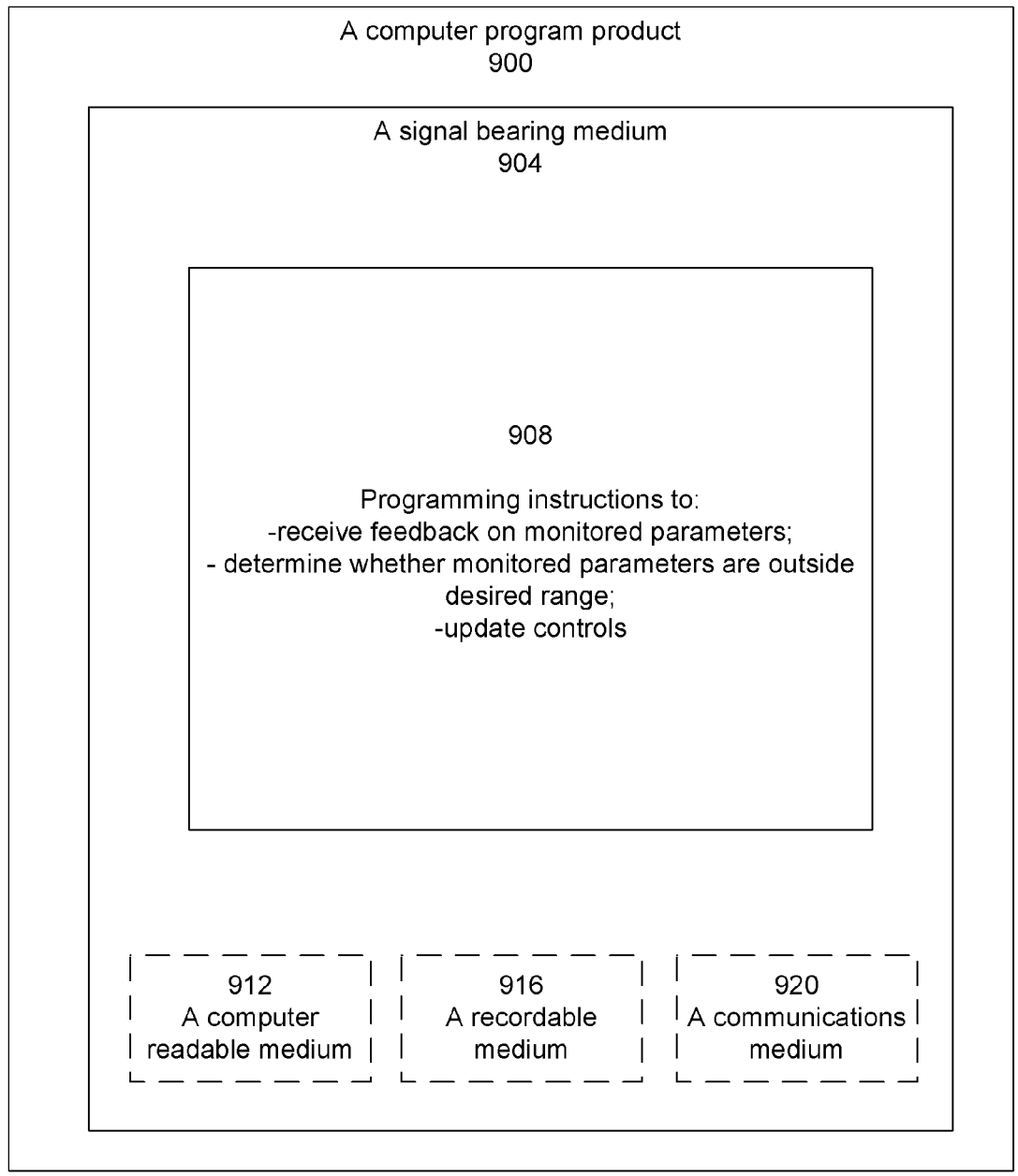
FIG. 9 is a block diagram of an example computer program product, all in accordance with at least some embodiments of the present disclosure.

FIG. 9 illustrates a block diagram of an example computer program product, arranged in accordance with at least some embodiments of the present disclosure. In some examples, as shown in FIG. 9, computer program product 900 may include a signal bearing medium 904 that may also include programming instructions 908. Programming instructions 908 may be to receive feedback on monitored parameters; determine whether monitored parameters are outside desired range; and update controls.

Also depicted in FIG. 9, in some examples, computer program product 900 may include one or more of a computer readable medium 912, a recordable medium 916, and a communications medium 920. The dotted boxes around these elements depict different types of mediums included within, but not limited to, signal bearing medium 904. These types of mediums may distribute programming instructions 908 to be executed by logic. Computer readable medium 912 and recordable medium 916 may include, but are not limited to, a flexible disk, a hard disk drive (HDD), a Compact Disc (CD), a DVD, a digital tape, a computer memory, etc. Communications medium 920 may include, but is not limited to, a digital and/or an analog communication medium (e.g., a fiber-optic cable, a waveguide, a wired communication link, a wireless communication link, etc.).

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B," similar to "A and/or B," will be understood to include the possibilities of "A" or "B" or "A and B." Furthermore, the phrase "A, B, and/or C" will be understood to include the possibilities of "A," "B," "C," "A and B," "A and C," "B and C," or "A, B and C."

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the disclosure. Those with skill in the art will readily appreciate that embodiments of the disclosure may be implemented in a very wide variety of ways. This disclosure is intended to cover any adaptations or variations of the embodiments discussed herein. Therefore, it is manifestly intended that embodiments of the disclosure be limited only by the claims and the equivalents thereof.

What is claimed is:

1. An air filtration system for filtering airborne contaminants from air, the system comprising:
    a panel structure comprising a plurality of individual and interchangeable filtering modules arranged in an array with each module adjacent and in contact with at least one other module, and each module comprising:
    an external wall defining an internal cavity therein, the external wall comprising:
    a first face comprising at least one opening into the internal cavity configured for permitting plant growth therethrough, and
    a second face opposite the first face, with the internal cavity located between the first face and the second face,
    a first side portion extending from the first face to the second face; and
    a second side portion extending from the first face to the second face, with the second side portion being opposite the first side portion,
    wherein the second face comprises an integral ventilator tube formed as a portion of the second face and extending along the second face from the first side portion to the second side portion, the ventilator tube having a first air interface at the first side portion, a second air interface at the second side portion, and a plurality of perforations,
    wherein each of the first and second air interfaces forms a substantially airtight seal and is configured to align with a first and second air interface of a ventilator tube of an adjacent module to form an airflow channel extending along the array,
    wherein the plurality of perforations are configured to provide a distributed air interface from the ventilator tube to an organic biofilter medium,
    the organic biofilter medium within the internal cavity, the organic biofilter medium comprising a microbial colony configured to biologically degrade airborne contaminants, and having a depth extending in a direction from the first face to the second face, and
    a plant rooted in the organic biofilter medium and growing through the opening in the first face, wherein the organic biofilter medium is configured to serve as a growth base for both the plant and the microbial colony; and
    an air-distribution network configured to pass air to be filtered into the airflow channel, into the internal cavity adjacent the second face, through the organic biofilter medium, and out of the internal cavity through the at least one opening in the first face to contact the air to be filtered with the microbial colony, wherein a first air interface for at least one module is connected to a flow control device.

2. The system of claim 1, wherein:
    the air-distribution network includes a vent interface configured to be coupled with a vent of an air-circulation system of a building; and
    the system further comprises air supply tubing connecting the vent interface with at least one ventilator tube to provide a forced airflow from the vent interface to the airflow channel.

3. The system of claim 2, wherein:
    the array of modules comprises a plurality of rows of adjacent modules with each row defining at least one airflow channel extending along the adjacent modules via the interconnected ventilator tubes of the adjacent modules;
    the system further comprises a support structure including at least one support member corresponding to each row of modules, wherein each of the modules is mounted on at least one of the support members to form the panel structure; and the air-distribution network further includes a valve assembly to independently control airflow to individual ones of the airflow channels of the rows of the modules.

4. The system of claim 3, further comprising a controller configured to control the valve assembly to independently vary airflows to individual ones of the airflow channels.

5. The system of claim 3, wherein each of the modules is identical, removable from the panel structure, and interchangeably replaceable with any other identical module.

6. The system of claim 5, wherein:
    the microbial colony is contiguous throughout the panel structure; and
    an air circulation system comprising a fan configured to force air to be filtered into the ventilator tube, into the internal cavity, and through the organic biofilter medium.

7. The system of claim 1, wherein the microbial colony includes at least one organism selected from a group of organisms consisting of Cylindrosporium, Phomopsis, Ramichloridium, Rosulomyces, Torulopsis, and Zygosporium.

8. The system of claim 1, wherein the microbial colony includes at least one organism selected from a group of organisms consisting of Acinetobacter, Azoarcus, Mycobacterium, Nevskia, Pseudomonas, and Rhodococcus.

9. The system of claim 1, wherein the first face comprises a grating comprising the opening.

10. The system of claim 9, wherein the plant growing through the opening has roots in the organic biofilter medium on a first side of the grating and leaves on a second side of the grating, the first side being opposite the second side of the grating.

11. The system of claim 1, wherein the organic biofilter medium serves as a growth base for the mycoremediate and/or a phytoremediate.

12. The system of claim 1, wherein the organic biofilter medium comprises a bacteria triggering material.

13. The system of claim 12, wherein the organic biofilter medium further comprises peat moss, vermiculite, pine bark, organic compost, and spent activated carbon.

14. The system of claim 5, wherein the panel structure is a wall structure.

* * * * *

UNITED STATES PATENT AND TRADEMARK OFFICE
CERTIFICATE OF CORRECTION

PATENT NO.        : 9,534,800 B2                                              Page 1 of 1
APPLICATION NO.   : 13/126448
DATED             : January 3, 2017
INVENTOR(S)       : Kruglick It is certified that error appears in the above-identified patent and that said Letters Patent is hereby corrected as shown below:

In the Specification

In Column 1, Line 7, delete "§371" and insert -- § 371 --, therefor.

In Column 2, Line 27, delete "respectfully" and insert -- respectively --, therefor.

In Column 2, Line 32, delete "ma be" and insert -- may be --, therefor.

Signed and Sealed this
Twenty-first Day of March, 2017

Michelle K. Lee
*Director of the United States Patent and Trademark Office*